(12) United States Patent
Faddoul et al.

(10) Patent No.: US 8,694,444 B2
(45) Date of Patent: Apr. 8, 2014

(54) LEARNING MULTIPLE TASKS WITH BOOSTED DECISION TREES

(75) Inventors: Jean-Baptiste Faddoul, Lille (FR); Boris Chidlovskii, Meylan (FR)

(73) Assignee: Xerox Corporation, Norwalk, CT (US)

( * ) Notice: Subject to any disclaimer, the term of this patent is extended or adjusted under 35 U.S.C. 154(b) by 168 days.

(21) Appl. No.: 13/451,816

(22) Filed: Apr. 20, 2012

(65) Prior Publication Data
US 2013/0282627 A1   Oct. 24, 2013

(51) Int. Cl.
*G06N 5/00* (2006.01)

(52) U.S. Cl.
USPC .............................................. 706/12; 706/45

(58) Field of Classification Search
USPC ...................................................... 706/12, 45
See application file for complete search history.

(56) References Cited

PUBLICATIONS

Chapelle, et al., Boosted multi-task learning, Machine Learning, 2010, pp. 1-25.*
Faddoul, J. et al. "Boosting Multi-task weak learners with applications to textual and social data", ICMLA 2010, pp. 1-6.
Quinlan, J.R. "Bagging, Boosting, and C4.5", AAAI-96 Proceedings, 1996, pp. 725-730.
Schapire, R. E. "Improved Boosting Algorithms Using confidence-rated predictions", Machine Learning, 1999, vol. 37, pp. 297-336.
Argyriou, et al. "Multi-Task Feature Learning", 2006, MIT Press, pp. 41-48.
Caruana, R. "Multitask learning", 1997, Machine Learning, vol. 28, pp. 41-75.
Freund, Y., et al. "Experiments with a New Boosting Algorithm", Proc. of the 13$^{th}$ Intl. Conf. on Machine Learning, 1996, pp. 148-156.
Hovelynck, M., et al. "Multi-modality in One-class Classification", 2010, Proc. of the 19$^{th}$ Intl. Conf. on World Wide Web, pp. 441-450.
Quadrianto, N., et al. "Multitask learning without label correspondence", NIPS, 2010, pp. 1957-1965.
Xue, Y., et al. "Multi-task learning for Classification with Dirichlet Process Priors", 2007, Journal of Machine Learning Research, vol. 8, pp. 35-63.
Grey, R. "Entropy and Information Theory", Jul. 16, 2009, pp. 1-313.

* cited by examiner

*Primary Examiner* — Wilbert L Starks
(74) *Attorney, Agent, or Firm* — Fay Sharpe LLP

(57) ABSTRACT

A multi-task machine learning method is performed to generate a multi-task (MT) predictor for a set of tasks including at least two tasks. The machine learning method includes: learning a multi-task decision tree (MT-DT) including learning decision rules for nodes of the MT-DT that optimize an aggregate information gain (IG) that aggregates single-task IG values for tasks of the set of tasks; and constructing the MT predictor based on the learned MT-DT. In some embodiments the aggregate IG is the largest single-task IG value of the single-task IG values. In some embodiments the machine learning method includes repeating the MT-DT learning operation for different subsets of a training set to generate a set of learned MT-DT's, and the constructing comprises constructing the MT predictor as a weighted combination of outputs of the set of MT-DT's.

23 Claims, 6 Drawing Sheets

LEARNING MULTIPLE TASKS WITH BOOSTED DECISION TREES

BACKGROUND

The following relates to the machine learning arts and related applications such as Internet spam filtering, document relevance assessment, and so forth.

The simplest machine learning problem is a single-task, single-class problem in which a sample is classified as belonging to a class or not belonging to the class. Substantially any binary classifier can be used for such a problem. Conceptually, the binary classifier defines a (hyper)plane in the feature space that divides samples belonging to the class from samples not belonging to the class. The classifier is learned (or trained) based on a training set of samples that are annotated as to whether or not they belong to the class, and the learning optimizes the position of the hyperplane. The learned classifier can then be used as a predictor to predict whether or not an input sample (which is not annotated, in general) belongs to the class.

A multi-task single-class problem performs multiple such "binary" classification tasks, each for a different class. An example of such a problem is a document annotation system in which a document may, or may not, be annotated with each of a set of classes of the classification system. To illustrate, the classes may be article categories, e.g. "sports", "politics", "national news", "weather", . . . . A given document may belong to none, one, two, or more of these classes, e.g., an article about a former athlete running for political office may properly belong in both "sports" and "politics". The simplest approach here is to separately learn a binary classifier for each task. However, this approach cannot leverage task interrelatedness. For example, an article classification of "politics" may increase the likelihood that the article also properly belongs in the "national news" category, but such a correlation will not be captured by independent classifiers that are separately learned for the two classes. Multi-task learning approaches simultaneously learn an integrated predictor that outputs predictions for all tasks of the multi-task problem. The multi-task learning approach can leverage correlations between the tasks.

An illustrative example of multi-task single class learning is set forth in Faddoul et al., "Boosting Multi-Task Weak Learners with Applications to Textual and Social Data", in Proceedings of the Ninth Intl Conf. on Machine Learning and Applications (ICMLA) pages 367-72 (2010), which extends multi-task adaptive boosting (MT-Adaboost) to the multi-task setting. The boosted weak classifiers were multi-task "stumps", which are trees having at each node a decision stump for one task. (A stump can be thought of as a one-level decision tree which has a test node and decision leaves). In this approach suitable re-weighting of examples from different tasks without label correspondences or shared examples was used to leverage the local relatedness of tasks.

A single-task multi-class problem performs a single classification task, but in this case the output is not binary but rather includes three or more possibilities. For example, rather than deciding whether a sample belongs to class A or not, a multi-class problem may decide to which class (or, in a multi-label setting, which class or classes) of the group of classes A, B, C, . . . the sample belongs. The various possible outputs are sometimes called "labels", and so the multi-class problem assigns one label (or one or more labels, in a multi-label setting) to the sample as selected by the classifier from the set of labels. Some intrinsically multi-class classifiers are known; additionally, a set of binary classifiers for the various classes can be employed as a multi-class classifier by using a combinational strategy such as "one versus all".

Finally, a multi-task multi-class problem includes multiple tasks, at least one of which is a multi-class task. A further distinction that can be made here is whether the label sets of the various tasks overlap. (In this context, a single-class task can be viewed as having a "label set" of two labels: the label "belongs to the class" and the label "does not belong to the class"). The assumption of no label overlap between tasks (i.e., label distinctness or no label correspondence) maximizes versatility. This assumption can be made even if some tasks actually do share some labels, by treating the labels as distinct in the different problems. However, even with label distinctness there remains the possibility of correlations between tasks. (Indeed, if two tasks actually share the a common label which is treated as distinct in the learning of the two tasks, it is likely that one task outputting the common label will strongly correlate with the other task outputting the common label.) Thus, it is advantageous to apply a multi-task learning framework to a multi-task multi-class problem.

One approach for machine learning is the decision tree (DT) approach. In a DT, at each node a decision rule is learned that optimally splits the available training data, and the processing iteratively follows from node to node, splitting at each node, until a decision node is reached, which is a leaf of the DT. Multi-class decision tree learning algorithms that employ adaptive boosting or bagging, such as the C4.5 algorithm, are known. See, e.g. Quinlan, "Bagging, Boosting, and C4.5", AAAI-96 pages 725-730 (1996); Schapire et al., "Improved Boosting Algorithms Using Confidence-rated Predictions", Machine Learning vol. 37 pages 297-336 (1999). The information gain (IG) is sometimes used as the criterion for optimizing the split performed by each decision rule.

In spite of substantial work in machine learning as briefly outlined above, there remains need for multi-task multi-class learning approaches that are applicable in the most versatile context of label distinctness (that is, which do not assume sharing of labels between tasks) and that effectively leverage local relatedness between tasks that may vary across the learning space.

BRIEF DESCRIPTION

In some illustrative embodiments disclosed as illustrative examples herein, an apparatus comprises an electronic data processing device configured to perform a multi-task machine learning method to generate a multi-task (MT) predictor for a set of N classification tasks where N is greater than or equal to two. The machine learning method includes: learning a multi-task decision tree (MT-DT) including learning decision rules for nodes of the MT-DT that optimize an aggregate information gain (IG) that aggregates single-task IG values for tasks of the set of N classification tasks; and constructing the MT predictor based on one or more learned MT-DTs. In some embodiments the aggregate IG is the largest single-task IG value of the single-task IG values. In some embodiments the machine learning method includes repeating the MT-DT learning operation for different subsets of a training set to generate a set of learned MT-DT's, and the constructing comprises constructing the MT predictor as a weighted combination of outputs of the set of MT-DT's.

In some illustrative embodiments disclosed as illustrative examples herein, in a method comprises: learning a multi-task decision tree (MT-DT) for a set of tasks including at least two tasks, the learning including learning decision rules for nodes of the MT-DT that maximize the largest single task information gain (IG) for tasks of the set of tasks; and constructing a multi-task (MT) predictor based on one or more learned MT-DTs. The learning and the constructing are suitably performed by an electronic data processing device.

In some illustrative embodiments disclosed as illustrative examples herein, a non-transitory storage medium stores instructions executable by an electronic data processing device to perform a method including (i) learning a set of multi-task decision trees (MT-DT's) for a set of tasks including at least two tasks using different subsets of a training set wherein the learning of each MT-DT includes learning decision rules for nodes of the MT-DT that maximize an aggregate information gain (IG) that aggregates single-task IG values for tasks of the set of tasks and (ii) constructing a multi-task (MT) predictor as a weighted combination of outputs of the learned set of MT-DT's

DETAILED DESCRIPTION

Figure 1:
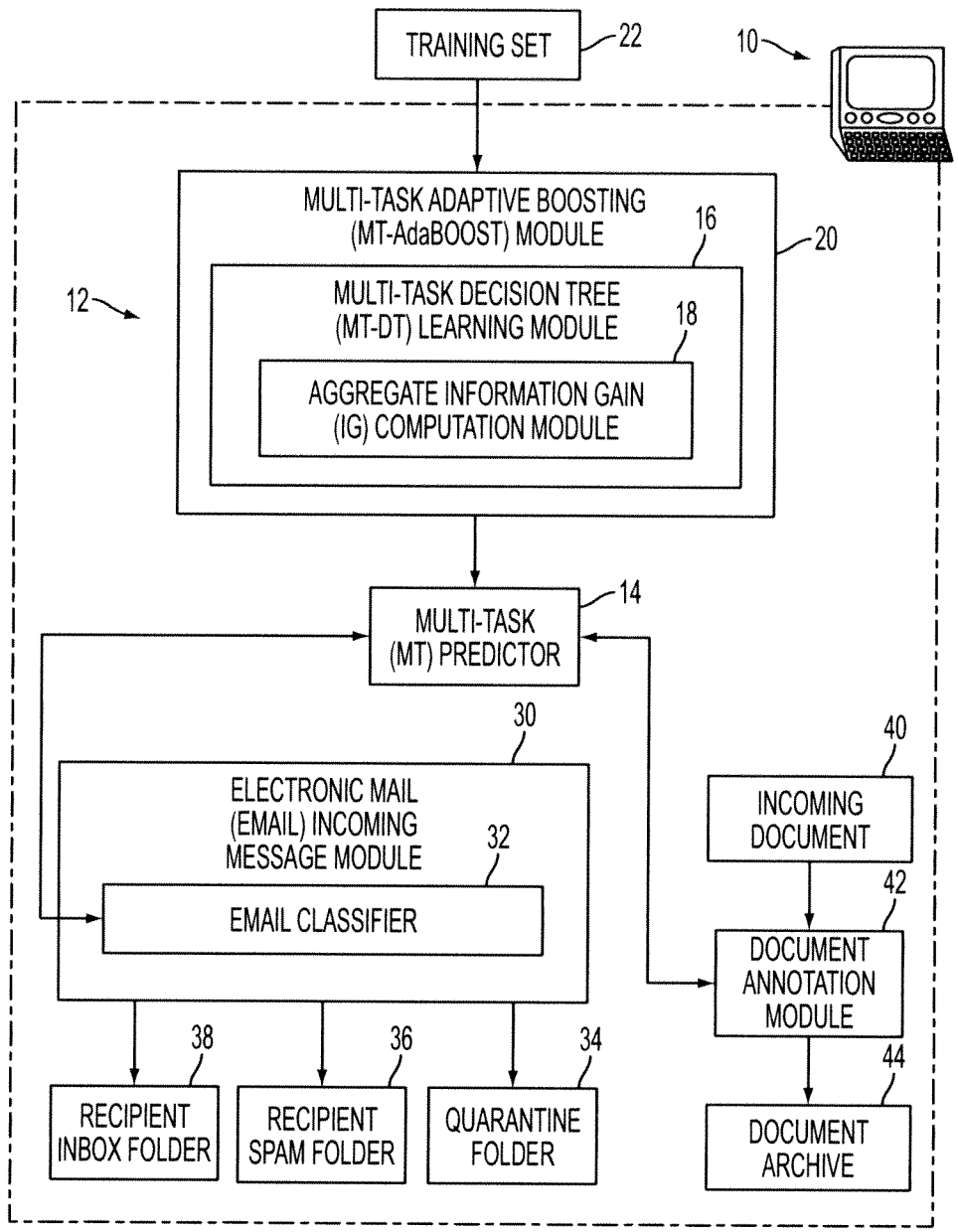
FIG. 1 diagrammatically illustrates a machine learning system and two illustrative predictor applications (email filtering and document annotation) that are implemented by a suitably programmed computer.

With reference to FIG. 1, a machine learning system is implemented by a suitably programmed computer 10. The machine learning system includes a learning component 12 which generates a predictor 14. The learning component 12 includes a multi-task decision tree (MT-DT) module 16 that learns at least one MT-DT from which the predictor 14 is generated (e.g., from the outputs of the decision leaf nodes of the learned MT-DT). The learning component 12 performs a multi-task learning problem for a set of tasks (where the number of tasks is at least two). Accordingly, the learning of the decision rules for the nodes of the MT-DT suitably employs an aggregate information gain (IG) 18 that aggregates single-task IG values for tasks of the set of tasks. In some embodiments a plurality of MT-DT's are learned and operate as "votes" in the framework of a multi-task adaptive boosting (MT-AdaBoost) module 20 to generate the predictor 14. The machine learning component 12 operates on a training set 22 comprising a set of samples that are annotated with class labels for the various tasks of the set of tasks. The machine learning optimizes the predictor 14 to minimize error between the label predictions generated by the predictor 14 and the class label annotations of the training set 22.

As used herein, the term "optimize" and similar phraseology (e.g., "optimization", "maximize", and so forth) is employed as ordinarily used in the art, and does not necessarily denote obtaining an absolute global optimum (or maximum, et cetera). For example, the optimization may terminate when an iteration-to-iteration improvement is less than a stopping value, and the resulting optimization may be a local maximum rather than the global maximum.

The generated multi-task (MT) predictor 14 can be used for various applications, two of which are diagrammatically shown in FIG. 1. In an electronic mail (email) filtering application, an email incoming message module 30 includes an email classifier 32 that applies the MT predictor 14 to classify the email respective to various tasks. For example, one task may assign the incoming email to a folder of the recipient's email inbox (in general this is a multi-class problem since the user may have a default inbox and multiple specialized folders defined by various email filters). Another task may determine whether the email is spam (for example, based on features such as keywords in the document, email sender address or so forth), while another task may determine whether the email is suspected of containing a virus (e.g., based on features such as executable file attachments or office file attachments with activated macros, email sender address, or so forth). These are typically binary tasks, e.g. the spam task has a set of labels: "spam" and "not spam". However, either the spam task or the virus filter task, or both, may be multi-class problems (e.g., spam and/or suspected viruses may be divided into different classes to facilitate follow-up to track down the spammer or the source of a circulating virus). The email incoming message module 30 processes an incoming email based on the class labels for the various tasks which are generated by the email classifier 32 using the MT-predictor 14. One suitable processing sequence is as follows: First, if the email contains a suspected virus, store in a quarantine folder 34 that is not accessible to the recipient. (The system administrator occasionally reviews the quarantine folder 34 to assess whether the quarantined emails actually contain viruses, and performs further semi-manual processing accordingly). Second, emails that are not suspected of containing viruses but which are classified as spam are placed in a recipient spam folder 36. This folder is accessible to the recipient so he or she can review the contents to ensure the emails are indeed spam rather than useful emails. The spam folder 36 may include some automated cleanup processing (e.g., spam emails older than one month may be deleted). Finally, emails which are not classified as either suspected viruses or spam are placed into the appropriate recipient inbox folder 38 (as determined by the multi-class email filtering task).

With continuing reference to FIG. 1, another illustrative application of the generated multi-task (MT) predictor 14 is document annotation. In this application an incoming document 40 is processed by a document annotation module 42 which invokes the MT predictor 14 to obtain content-appropriate document labels that the annotation module 42 adds to the document 40 as annotation metadata prior to storing the document in a document archive 44. In this case the document features may suitably be a bag-of-words representation of the textual content. A bag-of-words representation is a vector or other data structure whose elements contain word frequencies for vocabulary words used in assessing document content. The word frequencies are suitably word counts, optionally normalized by document length and/or in a term frequency-inverse document frequency (TF-IDF) format. The various tasks may include annotations as to document subject matter, document source, document date, and so forth.

The email filtering and document annotation applications are merely illustrative examples, and other applications are contemplated. It will be appreciated that the predictor 14 is to be trained for the given task, e.g. for the email filtering task the learning component 12 is applied to a training set of emails represented by suitable features and with annotated email filtering labels; whereas, for the document annotation task the learning component 12 is applied to a training set of documents represented by suitable bag-of-words representations and with annotated document category labels.

The various processing components 12, 30, 42 are suitably implemented by the computer 10 operating to execute suitable programming. More generally, the various processing components 12, 30, 42 are suitably implemented by an electronic data processing device such as the illustrative computer 10, or a network server, or an electronic tablet, or so forth. Moreover, the various processing components 12, 30, 42 can be embodied as a non-transitory storage medium storing instructions executable by an electronic data processing device to perform the disclosed functionality of the processing components 12, 30, 42. The non-transitory storage medium may, for example, be one or more of the following: a hard disk or other magnetic storage medium; a flash memory, random access memory (RAM), read-only memory (ROM), or other electronic storage medium; a DVD or other optical storage medium; or so forth.

Having overviewed the machine learning and prediction system with reference to FIG. 1, some illustrative examples of machine learning processing are set forth.

Let X be the instance space. A single supervised classification task T is defined as follows. Let D denote a distribution over X, let $f:X \rightarrow Y$ be a target function, and let the training set 22 of FIG. 1 include m samples. Given a sample $S=\{(x_i, y_i) | x_i \in X, y_i = f(x_i), 1 \leq i \leq m\}$, find a hypothesis function h which minimizes error$(h) = Pr_{<x,y> \sim D}[h(x) \neq y]$. Without loss of generality consider N tasks $T_1, \ldots, T_N$ (where for multi-task $N \geq 2$) over the instance space X and labels sets $Y_1, \ldots, Y_N$ for the N tasks. The most versatile assumption of no label correspondence between tasks is assumed—that is, $Y_i \cap Y_j = \emptyset$ for all $i \neq j$. (It is to be understood that there may in actuality be common labels, e.g. "politics" may be an element of both label set $Y_1$ and label set $Y_2$—but, in such as case the label "politics" in $Y_2$ will be considered as distinct from the label "politics" in $Y_1$ during the machine learning).

The objective is to learn the N classification tasks $T_1, \ldots, T_N$ simultaneously. A distribution D over $X \times \{1, \ldots, N\}$ is supposed. It is assumed that, for every j in $\{1, \ldots, N\}$, the projection on the distribution's $j^{th}$ component will correspond to the original distribution for task $T_j$. The multi-task classification algorithm takes as input a training set of the form $S=\{<x_i, y_i, j> | x_i \in X, y_i = f_j(x_i) \in Y_j, j \in \{1, \ldots, N\}, 1 \leq i \leq m\}$. It should be noted that the same example x can appear in a sample S with its label for different tasks. The goal is to find a hypothesis $h:X \rightarrow Y_1 \times \ldots \times Y_N$ which minimizes error$(h) = Pr_{<x,y,j> \sim D}[h_j(x) \neq y]$, where $h_j(x)$ is the $j^{th}$ component of $h(x)$ and $j \in \{1, \ldots, N\}$.

The disclosed machine learning employs a multi-task decision tree (MT-DT) approach. Decision tree learning uses a decision tree as a predictive model which maps observations about an item to the target values. In the case of classification trees, the tree leaves represent class labels and branches represent conjunctions of item attributes that lead to those class labels. At each node, a decision rule is learned that optimizes a figure-of-merit. In learning decision rules for the nodes of the MT-DT, a suitable figure-of-merit for the learning is the information gain (IG). See, e.g. J. Ross Quinlan, C4.5: PROGRAMS FOR MACHINE LEARNING (Morgan Kaufmann 1993). The processing works through the nodes iteratively.

Decision tree (DT) processing in the single-task case is as follows. Starting at the root node of the tree, the machine learning chooses an attribute that yields the highest IG on the training set. In other words, an attribute is selected that splits the training set into (most often two) subsets whose sum of labels entropy is the lowest. The algorithm then recursively applies the IG rule on the subsets at the (child) nodes depending from the root node, and so on. The recursion is stopped when all items of a subset have the same label—this is a decision leaf node corresponding to this label. Optionally, after generating such a DT, a "pruning" process is applied to generalize the rules learned to unobserved items.

The information gain about a random variable Y obtained from an observation that a random variable X takes the value $X=x$ is the Kullback-Leibler divergence $D_{KL}(p(Y|X) \| p(Y|I))$ of the prior distribution $P(Y|I)$ from the posterior distribution $P(Y|X)$ for Y given X. Also, the expected value of the IG is the reduction in the entropy of Y achieved by learning the state of the random variable X. The IG defines a sequence of attributes to investigate to rapidly narrow down the state of Y. Usually an attribute with high IG should be preferred over other attributes.

In the machine learning disclosed herein, the IG-based decision tree is employed in the multi-task setting, i.e. for learning a MT-DT. Toward this end, the IG is replaced by an "aggregate" IG that aggregates single-task IG values for tasks of the set of N tasks. However, there is a conceptual difference between single-task IG-based DT learning and IG-based MT-DT learning. In the single-task DT, the internal test nodes are used to guide the decision process while the final decision on assigning a label to a sample is made in a tree leaf.

The structure of MT-DT learning is different in the way that it guides the decision process for multiple tasks, and this process is not necessarily the same for all tasks. In particular, an MT-DT can make a final decision for some tasks in an internal node, rather than in leaf node of the MT-DT. This happens when the internal test node has enough information to classify an instance of a certain task $T_j \in \{T_1, \ldots, T_N\}$. In such a case, a decision leaf node with the appropriate classification decision for $T_j$ is added to the MT-DT and the learning proceeds with the remaining tasks. Put another way, the learning of decision rules for nodes includes determining whether a final decision can be made at a node for a task of the set of N tasks that is completed at the node. If so, then a decision node is added for any completed task.

Figure 2:
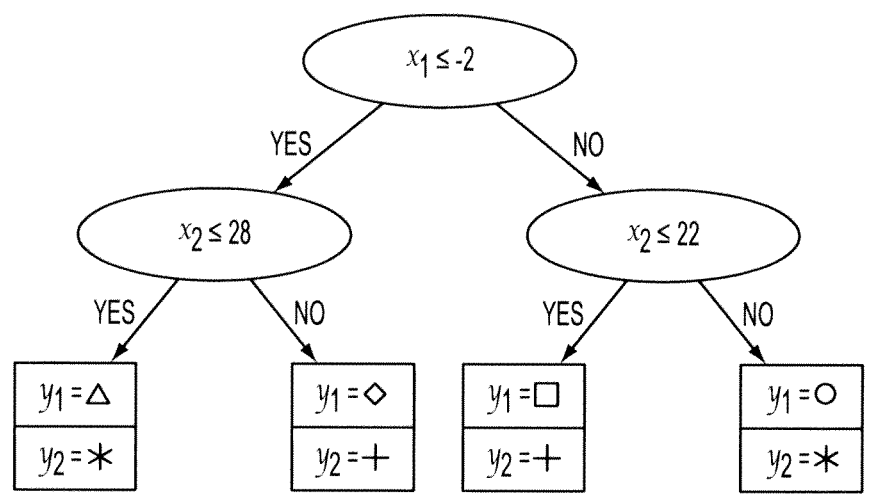
FIGS. 2 and 3 diagrammatically illustrate a multi-task decision tree (FIG. 2) and a plot of the corresponding data splitting (FIG. 3) for a two-task problem in which one task has four classes the other class has two labels.
Figure 3:
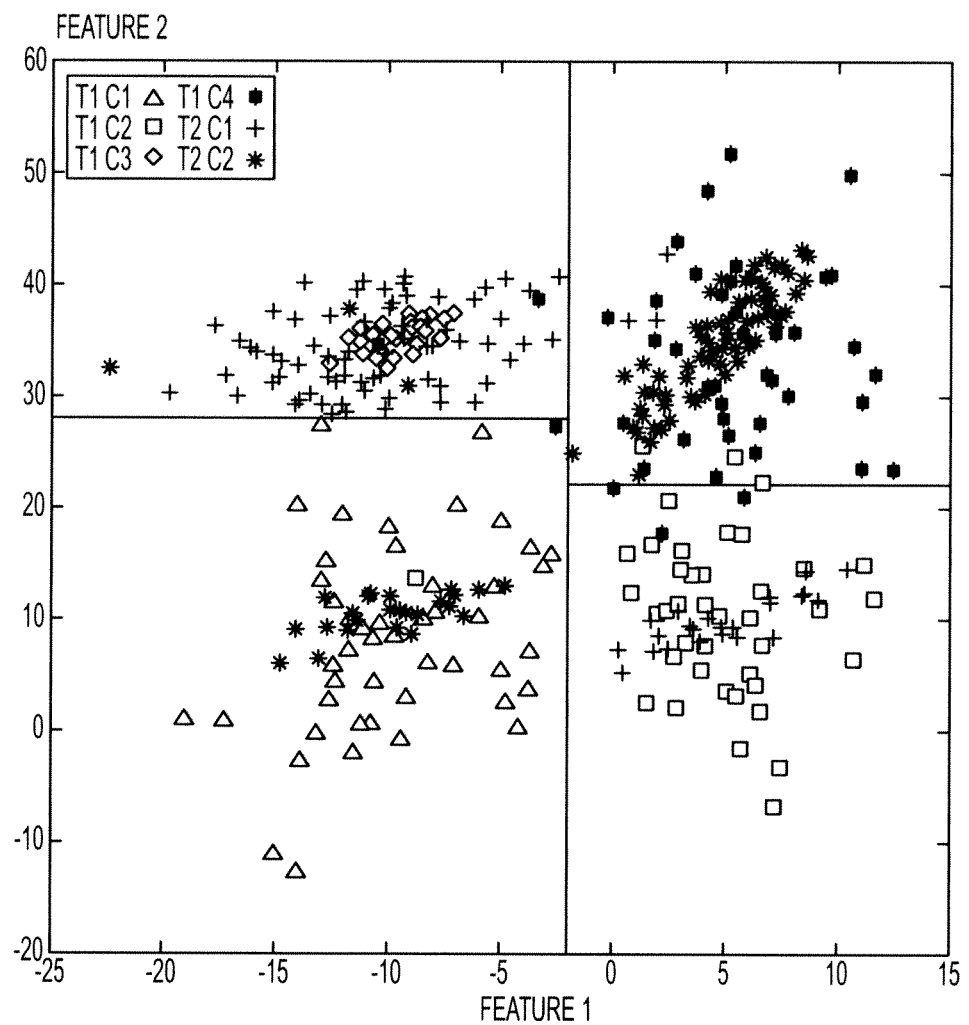

With reference to FIGS. 2-5, this difference is illustrated for an illustrative multi-task multi-class problem including two tasks (i.e., N=2), namely a first task $T_1$ having a label set $Y_1 = \{▲ ■ ♦ ●\}$ with four labels, and a second task $T_2$ having a label set $Y_2 = \{+ ✳\}$ with two labels. FIGS. 2 and 3 illustrate a MT-DT (FIG. 2) and the corresponding data splitting (FIG. 3) for such a two-task problem in which the labels have two-dimensional Gaussian distributions, and in which the labels (■, ♦) of task $T_1$ are correlated with the label (+) of task $T_2$, and the labels (▲, ●) of task $T_1$ are correlated with the label (✳) of task $T_2$. In this instance the MT-DT learning process is such that the two tasks $T_1$ and $T_2$ reach decision nodes at the same points in the MT-DT.

Figure 4:
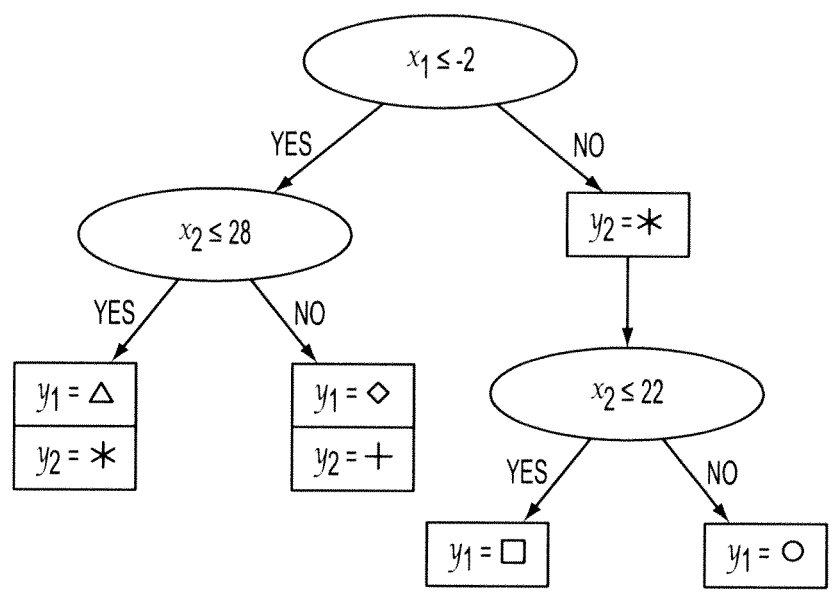
FIGS. 4 and 5 diagrammatically illustrate a multi-task decision tree (FIG. 4) and a plot of the corresponding data splitting (FIG. 5) for a two-task problem in which one task has four classes the other class has two labels, in a case in which the multi-task decision tree reaches an early decision.
Figure 5:
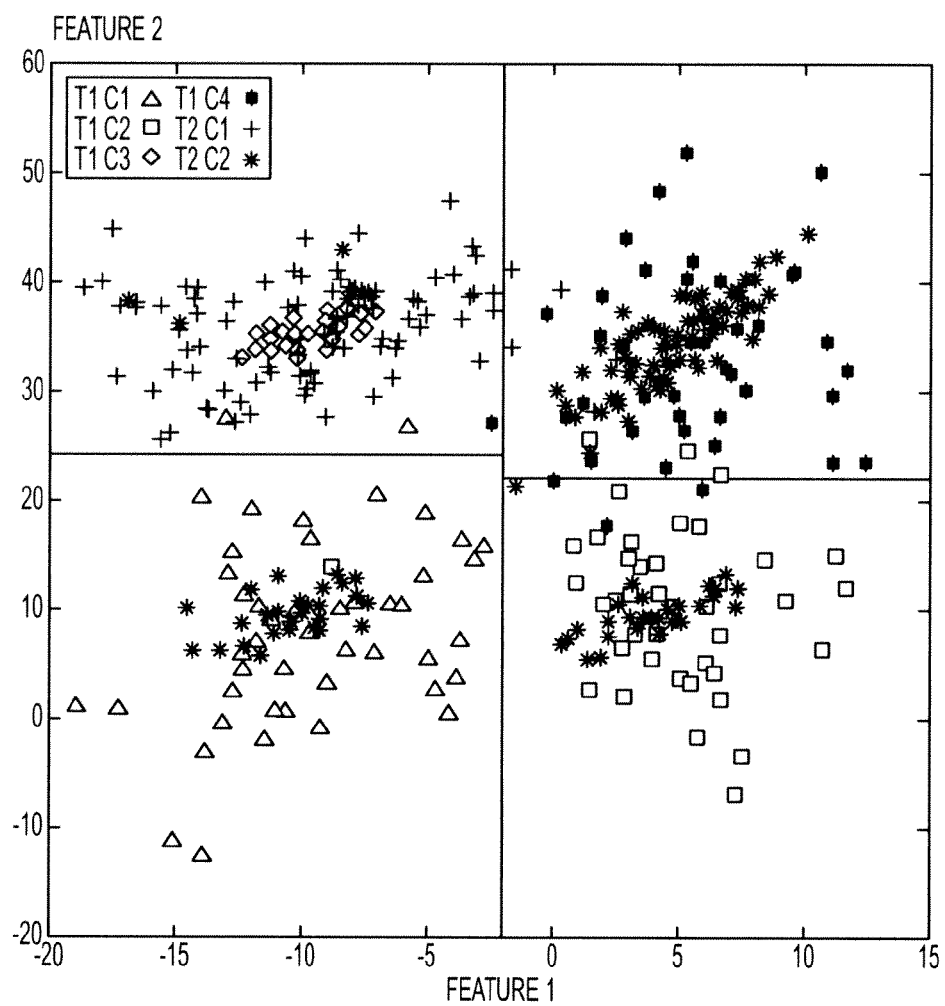

FIGS. 4 and 5, on the other hand, illustrate a situation in which an early decision is reached for the task $T_2$. In this case the labels have different two-dimensional Gaussian distributions, which results in a different correlation pattern between the tasks. In this example an early decision is reached for $T_2$ because knowing that the value of the feature $x_1$ is greater than −2 is enough to predict the label (✳) for task $T_2$. Accordingly, the decision node "$y_2 = ✳$" is added and the MT-DT learning continues on until final decisions are reached for the task $T_1$ (note that in the illustrations of FIGS. 2 and 4, decision nodes are shown as square nodes, while other nodes are shown as oval nodes).

In the multi-task setting, the single-task information gain (IG) is replaced by an aggregate IG that aggregates single-task IG values for tasks of the set of N tasks. The single-task information gain for a label set Y and the observation attribute X, denoted IG(Y; X), is an entropy-based criterion that can be expressed as follows:

$$IG(Y;X) = H(Y) - H(Y|X) \qquad (1),$$

where $H(Y) = -\Sigma_{y \in Y} p(y) \log p(y)$ is the marginal entropy of label set Y and $H(Y|X) = \Sigma_x p(x) H(Y|X=x)$ is the conditional entropy of Y knowing X.

In the multi-task setting, the single-task IG is replaced by an aggregate IG that aggregates single-task IG values for tasks of the set of N tasks. The N tasks have label sets $Y_1, \ldots, Y_N$, respectively. For learning the decision rules of nodes of the MT-DT, a natural approach is to treat all the tasks together and to use a joint information gain (denoted herein as $IG_1$ herein) as the aggregate IG. The joint information gain is given by $$IG_1 = IG\left(\bigcup_{j=1}^{N} Y_j \,\middle|\, X\right).$$

Another suitable aggregate IG is the unweighted sum of single-task IG values, denoted herein as $IG_2$. This aggregate information gain is given by $$IG_2 = \sum_{j=1}^{N} IG(Y_j \mid X).$$

Evaluations show that $IG_2$ is no better than $IG_1$ as a discriminative figure-of-merit.

It is shown herein that an aggregate IG which takes the largest single-task IG value of the single-task IG values provides performance that is superior to $IG_1$. This aggregate IG is denoted herein as $IG_3$, and is given by $IG_3 = \max\{IG(Y_j|X)\}$ where the $IG(Y_j|X)$ terms are the single-task IG values that are aggregated (the index j ranges $1, \ldots, N$ unless one or more tasks have reached a final decision prior to the node whose decision rule is being learned. Toward this end, the generalized grouping feature of the entropy is recalled in the following lemma (denoted Lemma 1 herein), which establishes a relationship between the entropy of an entire set of values and the entropies of its disjoint subsets. Lemma 1 is as follows: For $q_{kj} \geq 1$, such that $$\sum_{k=1}^{n} \sum_{j=1}^{m} q_{kj} = 1, \; p_k = \sum_{j=1}^{m} q_{kj}, \; \forall \; k = 1, \ldots, n,$$

the following holds:

$$H(q_{11}, \ldots, q_{1m}, q_{21}, \ldots, q_{2m}, \ldots, q_{n1}, \ldots, q_{nm}) \qquad (2)$$

$$H(p_1, \ldots, p_n) + \sum p_k H\left(\frac{q_{k1}}{p_k}, \ldots, \frac{q_{km}}{p_k}\right), \; p_k > 0, \; \forall \; k. \qquad (3)$$

Using Lemma 1, the following theorem (denoted Theorem 1 herein) can be proved pertaining to the relationship between (1) the joint information gain $$IG_1 = IG\left(\bigcup_{j=1}^{N} Y_j \,\middle|\, X\right)$$

of the full task set $T_1, \ldots, T_N$ and (2) the single-task information gain values $IG(Y_j|X), j=1, \ldots, N$. Theorem 1 is as follows: For N tasks with the class sets $Y_1, \ldots, Y_N$, let $p_j$ denote the fraction of task j in the full dataset, $$p_j = \frac{|S_j|}{\sum_{j=1}^{N} |S_j|}, \; j = 1, \ldots, N, \; \sum_{j=1}^{N} p_j = 1.$$

Then:

$$IG\left(\bigcup_{j=1}^{N} Y_j; X\right) = \qquad (4)$$

$$\sum_{j=1}^{N} p_j IG(Y_j; X) \leq \max\{IG(Y_1; X), \ldots, IG(Y_N; X)\}.$$

Theorem 1 can be proved as follows. First, Lemma 1 is used to develop the entropy term $$H\left(\bigcup_{j=1}^{N} Y_j\right)$$

of the single-task IG of Equation (1). This yields:

$$H\left(\bigcup_{j=1}^{N} Y_j\right) = H(p_1, \ldots, p_N) + \sum_{j=1}^{N} p_j H(Y_j), \qquad (5)$$

where $$\sum_{j=1}^{N} p_j = 1.$$

Second, the conditional entropy term of the single-task IG of Equation (1) is expressed as follows:

$$H\left(\bigcup_{j=1}^{N} Y_j \,\middle|\, X\right) = \sum_x p_x H\left(\bigcup_{j=1}^{N} Y_j \,\middle|\, X = x\right) \qquad (6)$$

$$= \sum_x p(x)\left(H(p_1, \ldots, p_N) + \sum_{j=1}^{N} p_j H(Y_j \mid X = x)\right) \qquad (7)$$

$$= H(p_1, \ldots, p_N) + \sum_{j=1}^{N} p_j \sum_x p(x) H(Y_j \mid X = x) \qquad (8)$$

$$= H(p_1, \ldots, p_N) + \sum_{j=1}^{N} p_j H(Y_j | X) \quad (9)$$

Now the entropy of Equation (5) and the conditional entropy of Equation (9) are combined to evaluate the joint entropy gain $$IG_1 = IG\left(\bigcup_{j=1}^{N} Y_j \middle| X\right),$$

yielding:

$$IG\left(\bigcup_{j=1}^{N} Y_j \middle| X\right) = H\left(\bigcup_{j=1}^{N} Y_j\right) - H\left(\bigcup_{j=1}^{N} Y_j \middle| X\right) \quad (10)$$

$$= \sum_{j=1}^{N} p_j IG(Y_j; X) \quad (11)$$

$$\leq \sum_{j=1}^{N} p_j \max\{IG(Y_1; X), \ldots, IG(Y_N; X)\} \quad (12)$$

$$= \max\{IG(Y_1; X), \ldots, IG(Y_N; X)\}. \quad (13)$$

This completes the proof of Theorem 1.

Theorem 1 provides a criterion $IG_3 = \max\{IG(Y_j|X)\}$ to guide the MT-DT learning in the multi-task case. It suggests that using the maximum single-task IG among the tasks can learn a better decision rule for a node of the MT-DT than one using the full data set.

Figure 6:
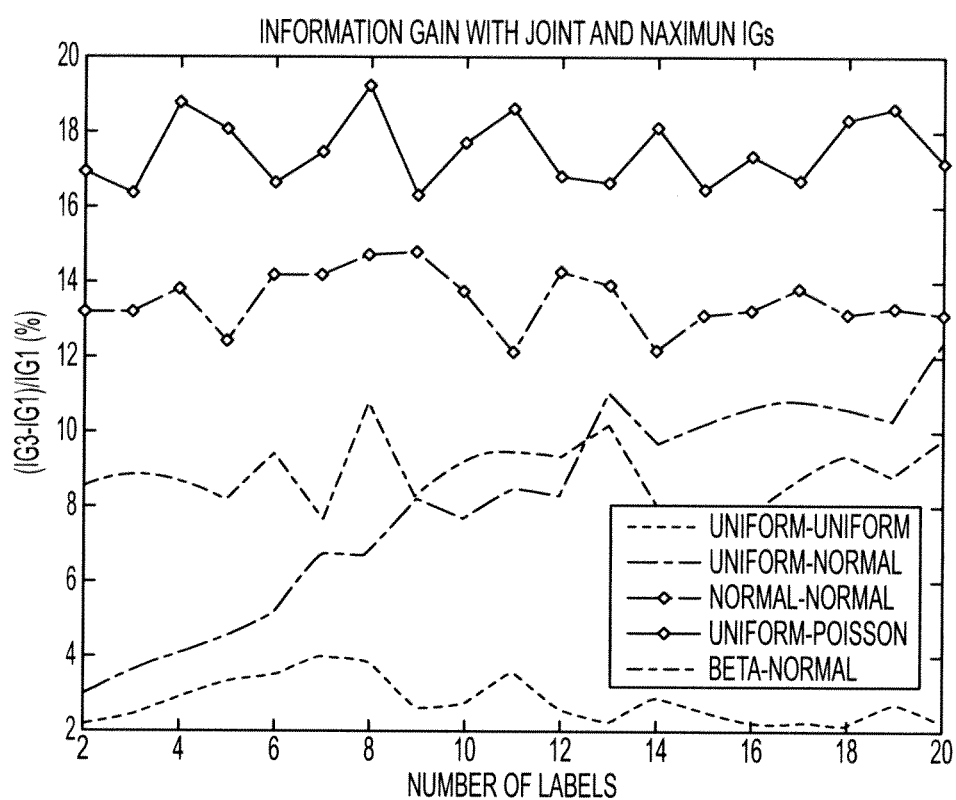
FIG. 6 plots aggregate information gain measures $IG_1$ and $IG_3$ (defined in the text herein) for various randomly generated dataset.

With reference to FIG. 6, the aggregate information gain $$IG_1 = IG\left(\bigcup_{j=1}^{N} Y_j \middle| X\right)$$

and the aggregate information gain $IG_3 = \max\{IG(Y_j|X)\}$ are compared for several randomly generated datasets. Two labels sets are generated using different combinations of the Uniform, Normal, Poisson or Beta distributions (used with the standard parameters); the number of labels in both sets vary from 2 to 20. Attribute X values are uniformly distributed in all cases. As FIG. 6 shows, $IG_3$ yields 2% to 18% more of information gain than $IG_1$.

Pseudo-code for a suitable implementation of an MT-DT learning algorithm is set forth in Algorithm 1. The algorithm makes a call to a function split which returns the node that maximizes a given information gain (which may, in general be $IG_1$, $IG_2$, or $IG_3$, although as set forth in Theorem 1 the criterion $IG_3$ is expected to provide the best performance) on a multi-task training sample S with respect to a distribution D over S. The algorithm also returns subsets of S resulting from splitting it based on the chosen node. At each node the algorithm adds a decision node for any task that has no items in the subset or that has only items with a single label. Then, it chooses a test node which maximizes the information gain value for the remaining tasks. The final output is the set res of the decision node leaves.

---

Algorithm 1: MT – DT learning algorithm

Require: $S = \bigcup_{j=1}^{j=N} \{e_i = \langle x_i, y_i, j \rangle | x_i \in \chi; y_i \in Y_j\}$ D: distribution over S
IG: information gain criterion 1: res = [ ] {Will contain the chosen node and early decision leaves, if any.}
2: for j = 1 to N do
3:   if task j's examples ($S_j$) has all the same label OR $S_j$ == φ then
4:     Add to res a leaf for task j and label y. {y is either the unique label of $S_j$ in case it is homogeneous or it is the majority label of its parent subset in case $S_j$ == φ}
5:     S = S\\$S_j$
6:   end if
7: end for
8: Call split (S, D)
9: Get back bestnode: the node which maximizes IG
10: Get back [$S^1, \ldots, S^V$]: subsets resulted front splitting S based on bestnode
11: Add bestnode to res
12: Call recursively on [$S^1, \ldots, S^V$] to get the children of res
13: return res

---

With returning reference to FIG. 1, Algorithm 1 is suitably performed by the MT-DT learning module 16 of the learning component 12. In some embodiments, the learning component 12 applies Algorithm 1 to construct the MT-predictor 14 by itself, that is, the MT predictor 14 is constructed based on a single learned MT-DT.

In other embodiments, Algorithm 1 is performed by the MT-DT learning module 16 of the learning component 12 within the framework of a multi-task adaptive boosting (MT-AdaBoost) framework implemented by the MT-AdaBoost module 20 illustrated in FIG. 1. Employing the MT-DT learning within the MT-AdaBoost framework combats the possibility of overfitting. Pseudo-code for a suitable implementation of MT-AdaBoost utilizing the MT-DT learning is set forth in Algorithm 2. In this algorithm, T denotes the number of boosting iterations. The procedure init initializes the distribution $D_1$ over S. The procedure WL is a weak learner that returns an MT-DT given as input a sample S and a distribution D over S. The final output is a multi-task classifier H from instance space X into $Y_1 \times \ldots \times Y_N$. As in single-task boosting algorithms, the MT-AdaBoost performed by Algorithm 2 calls the weak learner procedure WL repeatedly in a series of rounds. On each round t, the algorithm provides WL with the current distribution $D_t$ and the training sample S, and the weak learner procedure WL returns a classifier $h_t: X \to Y_1 \times \ldots \times Y_N$ which minimizes the training error on S with respect to $D_t$. The distribution $D_{t+1}$ is then calculated from $D_t$ and $h_t$ as follows.

---

Algorithm 2: MT-AdaBoost using MT-DT as weak learners

Require: $S = \bigcup_{j=1}^{j=N} \{e_i = <x_i, y_i, j> | x_i \in \chi; y_i \in Y_j\}$
1: $D_1 = \text{init}(S)$ initialize distribution
2: for t = 1 to T do
3:   $h^t = WL(S, D_t)$ {train the weak learner and get an hypothesis MT-DT}
4:   Calculate the error of $$h^t : \epsilon_t = \sum_{j=1}^{N} \sum_{i: h^t_j(x_i) \neq y_i} D_j(x_i).$$

5:   if $\epsilon_t > 1/2$ then
6:     Set T = t − 1 and abort loop.
7:   end if -continued Algorithm 2: MT-AdaBoost using MT-DT as weak learners 8: $\beta_t = \dfrac{\epsilon_t}{1 - \epsilon_t}$ {Update distribution:}
9:   if $h_t^j(x_i) == y_i$ then
10:     $D_{t+1}(e_i) = \dfrac{D_t(e_i) \times \beta_t}{Z_t}$ 11:   else
12:     $D_{t+1}(e_i) = \dfrac{D_t(e_i)}{Z_t}$ 13:   end if
14: end for
{Where $Z_t$ is a normalization constant chosen so that $D_{t+1}$ is a distribution}
15: return Classifier H defined by:

$$H_j(x) = \underset{y \in Y_j}{\arg\max} \left( \sum_{i=1}^{i=T} (\ln 1/\beta_t) \right), \ 1 \le j \le N$$

Examples correctly classified by $h_t$ have their weights multiplied by $0 \le \beta \le 1$ (i.e., their weights are decreased), and the weights of misclassified examples are left unchanged. Finally, the weights are renormalized by dividing by the normalization constant $Z_t$. The final classifier H for a given task j is a weighted vote of the weak classifiers' predictions for this task. More particularly, for each example/task pair (x,j), the final classifier H predicts the label $y \in Y_j$ that maximizes the sum of weights of the weak hypotheses predicting y for the task j. The weight given to hypothesis $h_t$ is defined to be $\ln(1/\beta_t)$ so that greater weight is given to hypotheses with lower error. If the weak hypotheses have error only slightly better than ½, then the (training) error of the final hypothesis H drops to zero exponentially fast in function to the number of boosting iterations T.

The disclosed multi-task multi-class machine learning techniques, using the various aggregate information gains $IG_1$, $IG_2$, $IG_3$ discussed herein, have been tested on three datasets.

The first dataset was randomly generated, and was subject to a multi-task problem comprising two binary tasks. They share both the same 100 real valued features. Each task was a mixture of two multi-variate Gaussians, one for each label class. The tasks are made related as follows. The parameters of the $i^{th}$ Gaussian for each task was sampled from the same distribution. Each task has 100 examples, 50 for each label.

The second dataset was derived from the publicly available Enron dataset (http://www.cs.cmu.edu/~enron/). This dataset contains all e-mails sent and received by some 150 accounts of the top management of Enron Corporation spanning a period of several years. Annotations of the Enron dataset come from two different sources. The first is from the Department Of Justice of the United States (DOJ; see http://www.usdoj.gov/enron/), which has published a list of responsive emails used in the trials against two Chief Executive Officers of Enron. This set along with a manually annotated set of non-responsive emails constitute a binary classification task, Responsive v. Non-Responsive, with total of 372 emails. The second annotated set comes from students of Berkeley University. Emails in this set are annotated by topic, for an average of 250 emails per topic. Five topics were used in the experiments: Business, Legal, Influence, Arrangement, and Personal. Since the two sets are small, and they share some common knowledge (for example, a personal email is not likely to be a responsive email), learning the tasks simultaneously was expected to be advantageous. It should be noted, that those two sets are disjoint, that is, there are no examples provided with both annotations. The textual features of Enron dataset were used along with the social features generated from the underlying social network (for more details, see http://www.usdoj.gov/enron/).

The third dataset was a spam filtering dataset. This dataset was used for the ECML/PKDD 2006 discovery challenge, and contains email inboxes of 15 users. Each inbox has 400 spam emails. They are encoded by standard bag-of-word vector representation. Each user was considered as a task. The tasks are related because they all aim to filter out spam emails, but they are not identical because each user has different preferences. For example, one user might consider a certain email as spam whereas another user might not.

Experimental results of MT-DTs learned using $IG_1$, $IG_2$, and $IG_3$ are reported. Results using MT-DTs are also compared with single-task decision trees learned using the C4.5 algorithm. See J. Ross Quinlan, C4.5: PROGRAMS FOR MACHINE LEARNING (Morgan Kaufmann 1993). In all experiments 5-fold cross validation was used, where each run consists of training on four folds and testing on the remaining one. All methods were run three times on a random shuffle of the data and the average values are reported.

Results on the synthetic data are shown in Table 1. It is seen that MT-DT with $IG_3$ provided a significant improvement over C4.5. While $IG_1$ and $IG_2$ behaved comparably to C4.5, they are slightly better on Task-1, but suffer an accuracy drop on Task-2.

TABLE 1

Average classification accuracy on the two synthetic tasks

| Tasks | Train (Test) | C4.5 | $IG_1$ | $IG_2$ | $IG_3$ |
|---|---|---|---|---|---|
| Task-1 | 80 (20) | 83.10 ± 1.32 | 83.74 ± 3.43 | 83.74 ± 3.43 | 85.67 ± 1.21 |
| Task-2 | 80 (20) | 84.24 ± 2.21 | 83.65 ± 3.77 | 82.43 ± 2.32 | 84.98 ± 1.53 |
| Avg | | 83.67 | 83.70 | 83.09 | 85.23 |

The same behavior was observed on the Enron dataset with results reported in Table 2. It shows $IG_3$ performed better than the other aggregate IG criteria in accuracy values. However, learning tasks simultaneously does not bring the same improvement to all tasks, as some tasks tend to benefit more from multi-task learning than others. The results on the three datasets especially on EMCL'06 data (see Table 3) show that more difficult tasks (tasks with a lower accuracy) have a larger margin of improvement. In other words, the transfer of knowledge between tasks is not symmetric; rather, easier tasks provide more knowledge to the more difficult ones.

TABLE 2

Average classification accuracy on Enron tasks

| Tasks | Train (Test) | C4.5 | $IG_1$ | $IG_2$ | $IG_3$ |
|---|---|---|---|---|---|
| Responsive Vs. NonResponsive | 299 (74) | 80.0 ± 2.49 | 80.52 ± 2.75 | 80.21 ± 3.43 | 81.67 ± 1.21 |

TABLE 2-continued

Average classification accuracy on Enron tasks

| Tasks | Train (Test) | C4.5 | $IG_1$ | $IG_2$ | $IG_3$ |
|---|---|---|---|---|---|
| 5-Topics | 265 (66) | 79.03 ± 3.85 | 80.65 ± 3.77 | 79.43 ± 2.32 | 82.20 ± 0.94 |
| Avg | | 79.52 | 80.59 | 79.82 | 81.94 |

TABLE 3

Average classification accuracy on three ECML'06 user inboxes

| Tasks | Train (Test) | C4.5 | $IG_1$ | $IG_2$ | $IG_3$ |
|---|---|---|---|---|---|
| User-1 | 320 (80) | 86.45 ± 1.23 | 86.19 ± 1.14 | 86.00 ± 1.88 | 87.65 ± 3.42 |
| User-2 | 320 (80) | 85.13 ± 2.16 | 85.53 ± 2.22 | 85.07 ± 3.16 | 88.93 ± 3.44 |
| User-3 | 320 (80) | 88.03 ± 2.11 | 88.22 ± 2.56 | 88.52 ± 1.33 | 88.19 ± 2.51 |
| Avg | | 86.54 | 86.65 | 86.53 | 88.26 |

The results shown in Table 4 compare boosted MT-DTs to the boosted C4.5 trees. The AdaBoost.M1 algorithm was used for adaptive boosting of the C4.5 trees. See Schapire et al., "Improved Boosting Algorithms Using Confidence-rated Predictions", Machine Learning vol. 37 pages 297-336 (1999). Algorithm 2 was used for adaptive boosting of the MT-DT trees. Both algorithms have only one parameter, namely the number of boosting iterations, which was set equally to 20 in the experiments. The average values of classification accuracy over three random runs are reported in Table 4. With boosted trees an accuracy improvement was observed which was similar to that observed for single trees, and the adaptively boosted MT-DT performed significantly better than the boosted C4.5 decision trees. It was also again observed that the more difficult tasks enjoyed a larger margin of improvement.

TABLE 4

Average classification accuracy of boosted trees on Enron tasks

| Tasks | Train (Test) | Adaboost C4.5 | MT-Adaboost $IG_1$ | MT-Adaboost $IG_2$ | MT-Adaboost $IG_3$ |
|---|---|---|---|---|---|
| Responsive Vs. NonResponsive | 299 (74) | 85.03 ± 1.51 | 85.35 ± 1.15 | 84.71 ± 1.31 | 87.18 ± 1.01 |
| 5-Topics | 265 (66) | 81.02 ± 1.32 | 83.74 ± 2.20 | 83.19 ± 2.77 | 86.10 ± 0.09 |
| Avg | | 83.03 | 84.55 | 83.95 | 86.64 |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An apparatus comprising:
an electronic data processing device configured to perform a multi-task machine learning method to generate a multi-task (MT) predictor for a set of N classification tasks where N is greater than or equal to two, the machine learning method including:
learning a multi-task decision tree (MT-DT) including learning decision rules for nodes of the MT-DT that optimize an aggregate information gain (IG) that aggregates single-task IG values for tasks of the set of N classification tasks; and
constructing the MT predictor based on one or more learned MT-DTs.

2. The apparatus of claim 1 wherein at least one task of the set of N classification tasks is a multi-class task.

3. The apparatus of claim 2 wherein the learning of decision rules for nodes further includes (i) determining whether a final decision can be made at a node for a task of the set of N classification tasks that is completed at the node and (ii) adding a decision node for any completed task.

4. The apparatus of claim 1 wherein the aggregate IG is the largest single-task IG value of the single-task IG values.

5. The apparatus of claim 1 wherein the aggregate IG is $\max\{IG(Y_j|X)\}$ where the $IG(Y_j|X)$ terms are the single-task IG values for tasks $T_j$, $j=1, \ldots, N$ that are aggregated.

6. The apparatus of claim 1 wherein the constructing includes:
constructing the MT predictor based on a single learned MT-DT.

7. The apparatus of claim 1 wherein the machine learning method includes repeating the MT-DT learning operation for different subsets of a training set to generate a set of learned MT-DT's, and the constructing comprises:
constructing the MT predictor as a weighted combination of outputs of the set of MT-DT's.

8. The apparatus of claim 7 wherein the constructing includes:
combining the outputs of the MT-DT's using a multi-task adaptive boosting (MT-AdaBoost) algorithm.

9. The apparatus of claim 1 wherein the electronic data processing device is further configured to perform a multi-task inference method using the constructed MT predictor.

10. The apparatus of claim 9 wherein the multi-task inference method comprises classifying an input electronic mail (email) message using the constructed MT predictor.

11. The apparatus of claim 9 wherein the multi-task inference method comprises annotating an input document using the constructed MT predictor.

12. A method comprising:
learning a multi-task decision tree (MT-DT) for a set of tasks including at least two tasks, the learning including learning decision rules for nodes of the MT-DT that maximize the largest single-task information gain (IG) for tasks of the set of tasks; and constructing a multi-task (MT) predictor based on one or more learned MT-DTs;

wherein the learning and the constructing are performed by an electronic data processing device.

13. The method of claim 12 wherein at least one task of the set of tasks is a multi-class task.

14. The method of claim 13 wherein the learning of decision rules for nodes includes (i) determining whether a final decision can be made at a node for a task of the set of tasks that is completed at the node and (ii) adding a decision node for any completed task.

15. The method of claim 12 wherein the MT-DT learning operation is repeated for different subsets of a training set to generate a set of learned MT-DT's, and the constructing comprises:

constructing the MT predictor as a weighted combination of outputs of the set of learned MT-DT's.

16. The method of claim 15 wherein the constructing includes:

combining the outputs of the set of learned MT-DT's using a multi-task adaptive boosting (MT-AdaBoost) algorithm.

17. The method of claim 12 wherein the electronic data processing device is further configured to perform a multi-task inference method using the constructed MT predictor.

18. A non-transitory storage medium storing instructions executable by an electronic data processing device to perform a method including (i) learning a set of multi-task decision trees (MT-DT's) for a set of tasks including at least two tasks using different subsets of a training set wherein the learning of each MT-DT includes learning decision rules for nodes of the MT-DT that maximize an aggregate information gain (IG) that aggregates single-task IG values for tasks of the set of tasks and (ii) constructing a multi-task (MT) predictor as a weighted combination of outputs of the learned set of MT-DT's.

19. The non-transitory storage medium of claim 18 wherein at least one task of the set of tasks is a multi-class task.

20. The non-transitory storage medium of claim 19 wherein the learning of decision rules for nodes includes (i) determining whether a final decision is made for a task at the node and (ii) adding a decision node for any decided task.

21. The non-transitory storage medium of claim 18 wherein the aggregate IG is the maximum single-task IG value of the single-task IG values.

22. The non-transitory storage medium of claim 18 wherein the aggregate IG is $\max\{IG(Y_j|X)\}$ where the $IG(Y_j|X)$ terms are the single-task IG values that are aggregated.

23. The non-transitory storage medium of claim 18 wherein the constructing includes:

combining the outputs of the MT-DT's using a multi-task adaptive boosting (MT-AdaBoost) algorithm.

* * * * *